United States Patent
Lin et al.

(10) Patent No.: US 10,286,550 B2
(45) Date of Patent: May 14, 2019

(54) ROBOT TEACHING SYSTEM AND CONTROL METHOD THEREOF

(71) Applicant: NATIONAL TAIPEI UNIVERSITY OF TECHNOLOGY, Taipei (TW)

(72) Inventors: Hsien-I Lin, Taipei (TW); Jui-Hsin Liu, Taipei (TW)

(73) Assignee: NATIONAL TAIPEI UNIVERSITY OF TECHNOLOGY, Taipei (TW)

(*) Notice: Subject to any disclaimer, the term of this patent is extended or adjusted under 35 U.S.C. 154(b) by 231 days.

(21) Appl. No.: 15/367,195

(22) Filed: Dec. 2, 2016

(65) Prior Publication Data
US 2018/0154519 A1   Jun. 7, 2018

(51) Int. Cl.
  *G06F 19/00* (2018.01)
  *B25J 9/16* (2006.01)
  *B25J 13/08* (2006.01)
  *B25J 13/02* (2006.01)

(52) U.S. Cl.
  CPC ........... *B25J 9/163* (2013.01); *B25J 13/025* (2013.01); *B25J 13/085* (2013.01); *Y10S 901/03* (2013.01)

(58) Field of Classification Search
  CPC ........ B25J 9/163; B25J 13/025; B25J 13/085; Y10S 901/03
  USPC .................................................. 700/245, 250
  See application file for complete search history.

(56) References Cited

U.S. PATENT DOCUMENTS

| | | | |
|---|---|---|---|
| 8,805,662 B2 * | 8/2014 | White | G09B 23/32 703/11 |
| 9,039,681 B2 * | 5/2015 | Wang | G05B 15/02 606/1 |
| 9,789,605 B2 * | 10/2017 | Meier | B25J 9/1602 |
| 2004/0254771 A1 * | 12/2004 | Riener | G09B 23/32 703/7 |
| 2006/0079817 A1 * | 4/2006 | Dewald | A61H 1/02 601/5 |
| 2008/0150891 A1 * | 6/2008 | Berkley | G06F 3/016 345/156 |
| 2010/0312129 A1 * | 12/2010 | Schecter | A61B 5/0031 600/508 |
| 2011/0020779 A1 * | 1/2011 | Hannaford | G09B 23/28 434/262 |
| 2012/0190981 A1 * | 7/2012 | Harris | A61B 34/30 600/439 |
| 2014/0222023 A1 * | 8/2014 | Kim | A61B 34/30 606/130 |

\* cited by examiner

*Primary Examiner* — Ronnie M Mancho
(74) *Attorney, Agent, or Firm* — Chih Feng Yeh; Huntington IP Consulting Co., Ltd.

(57) ABSTRACT

A robot teaching system and control method thereof are disclosed. In robot teaching system, a haptic device generates pieces of teaching data to a robot, so that the robot moves and rotates according to the pieces of teaching data, and a force sensor captures first feedback data corresponding to the motion and rotation of the robot and outputs a feedback signal, which corresponds to the first feedback data, to the haptic device. Thus, the user, who controls the haptic device, can understand the situation of the robot and react to the situation immediately, so as to avoid the risk for lack of user's instant reaction to the situation of the robot in the conventional robot teaching system.

8 Claims, 8 Drawing Sheets

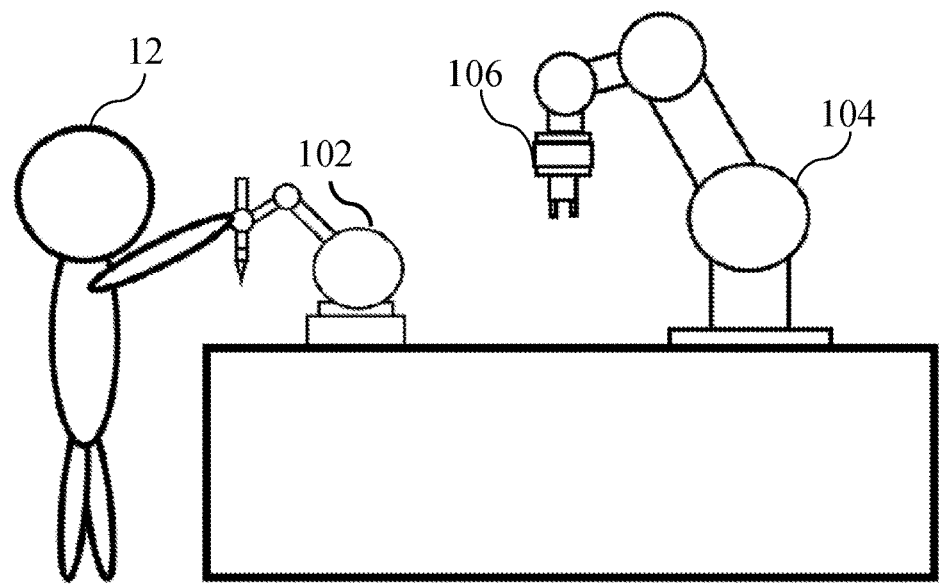
【Fig. 1】
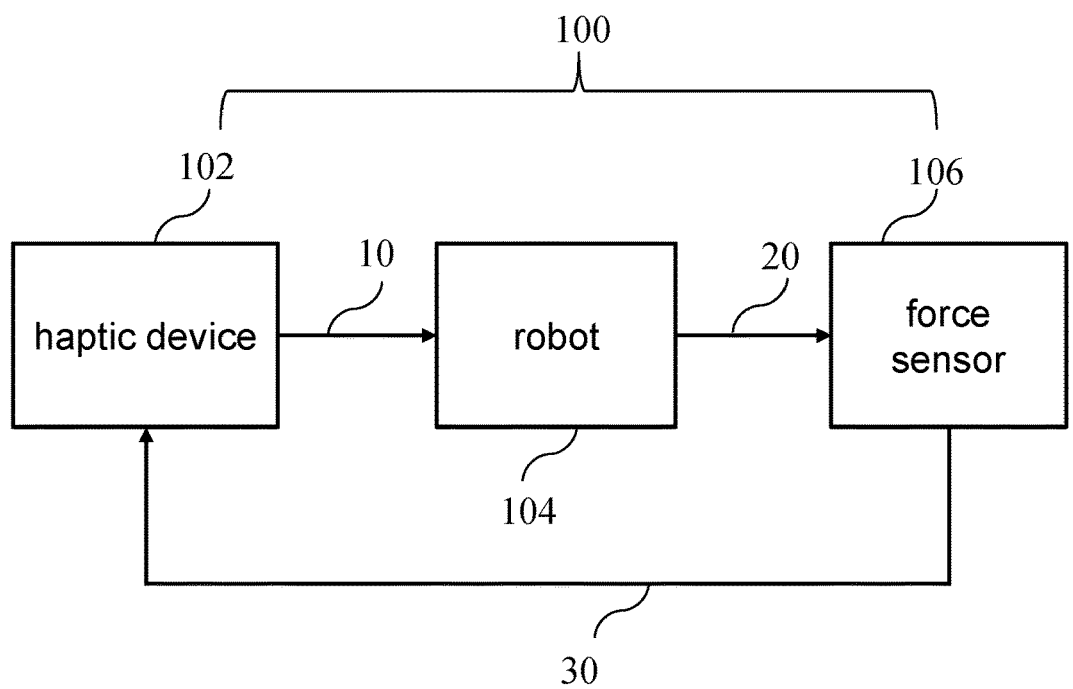
【Fig. 2】

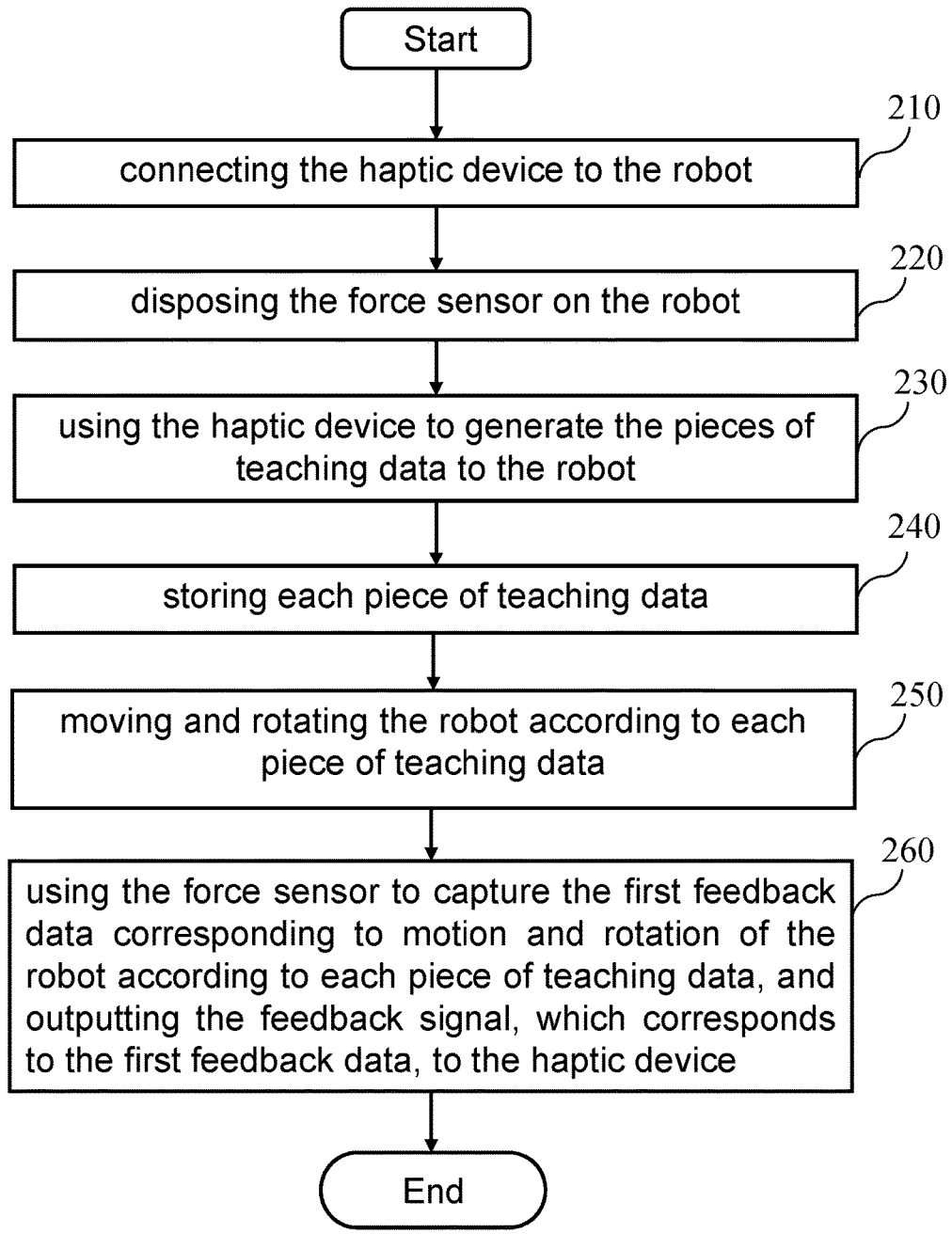
【Fig. 3】

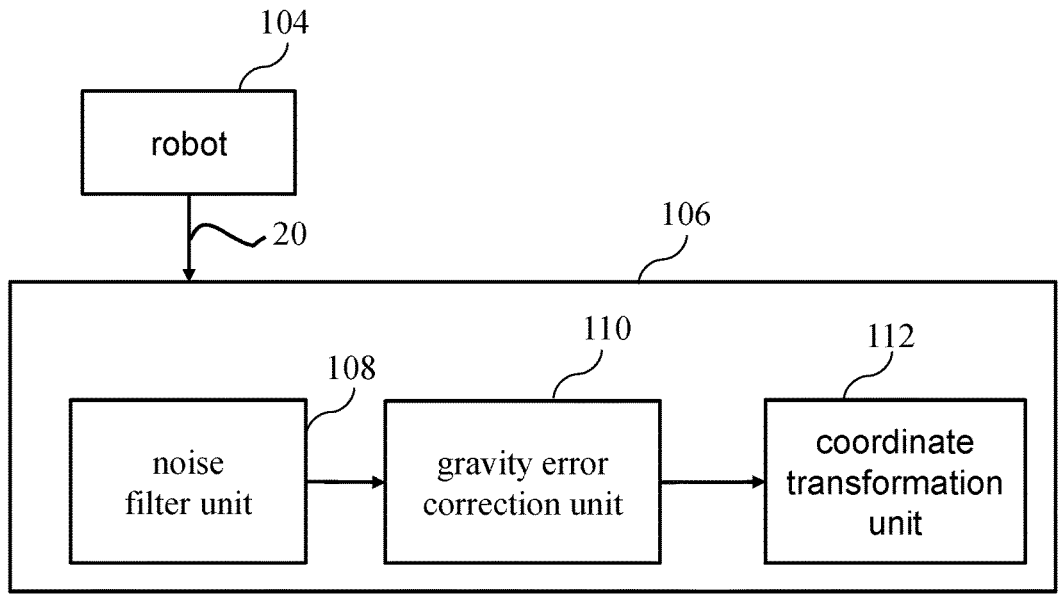
【Fig. 4】
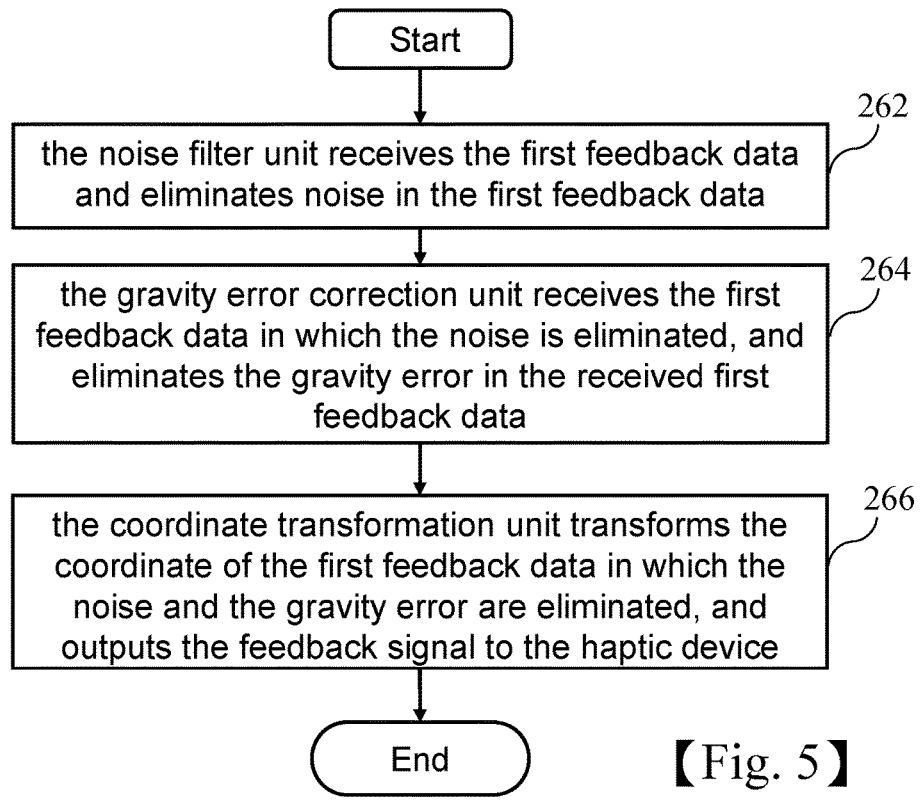
【Fig. 5】

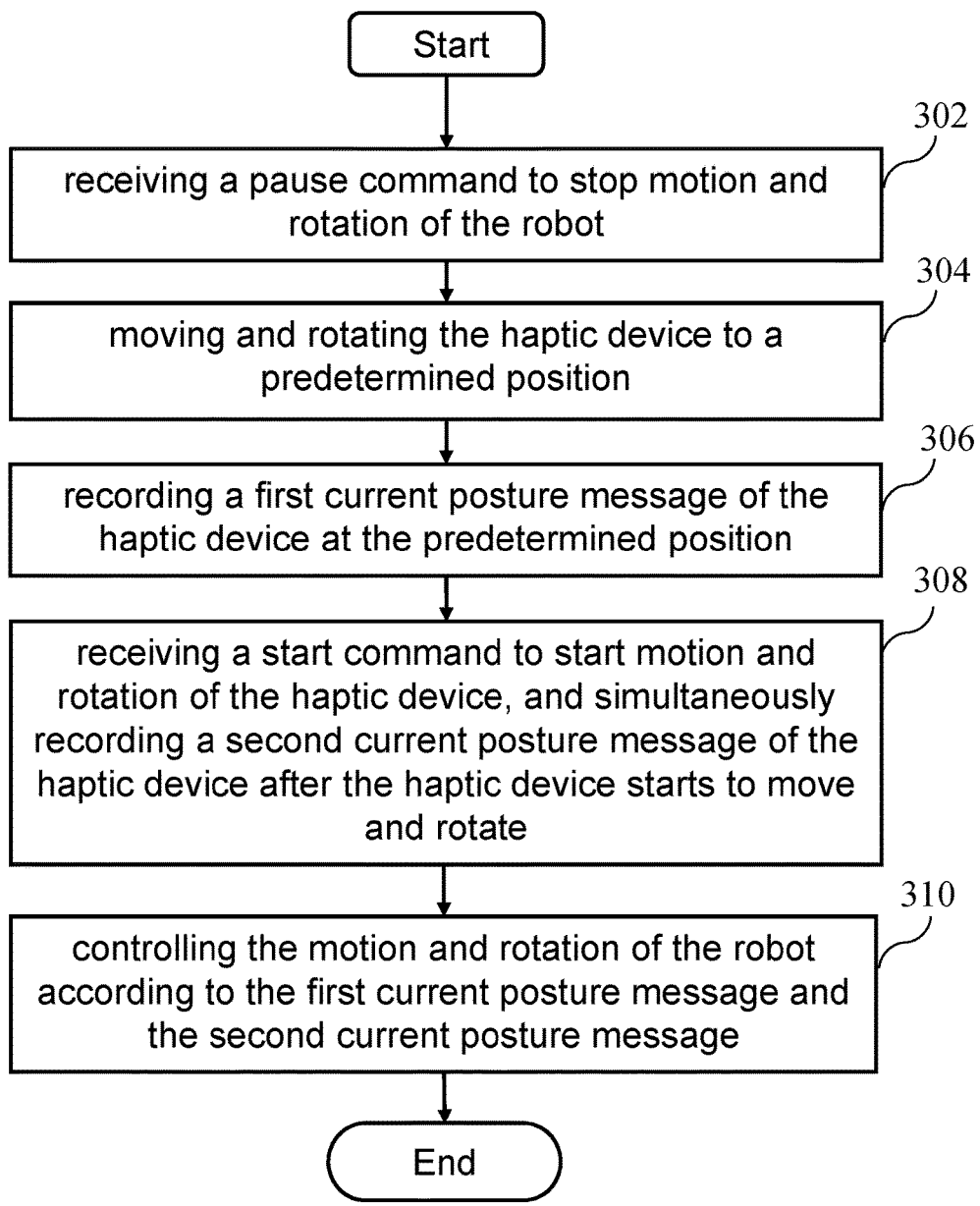
[Fig. 6]

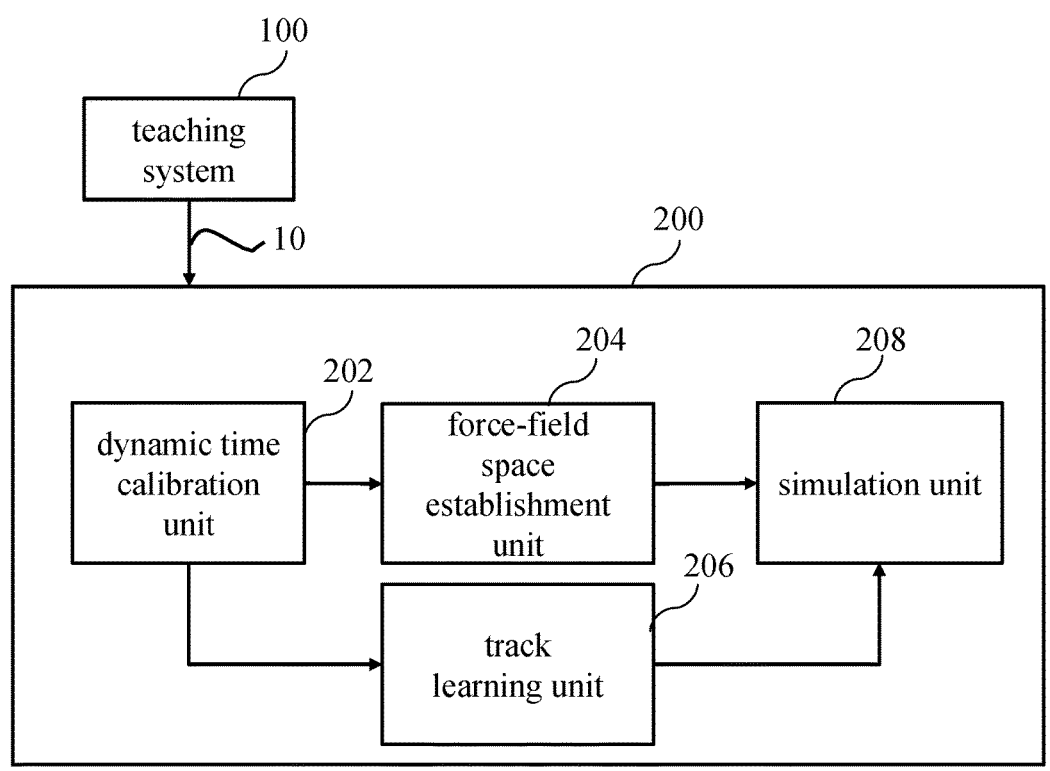
[Fig. 7]

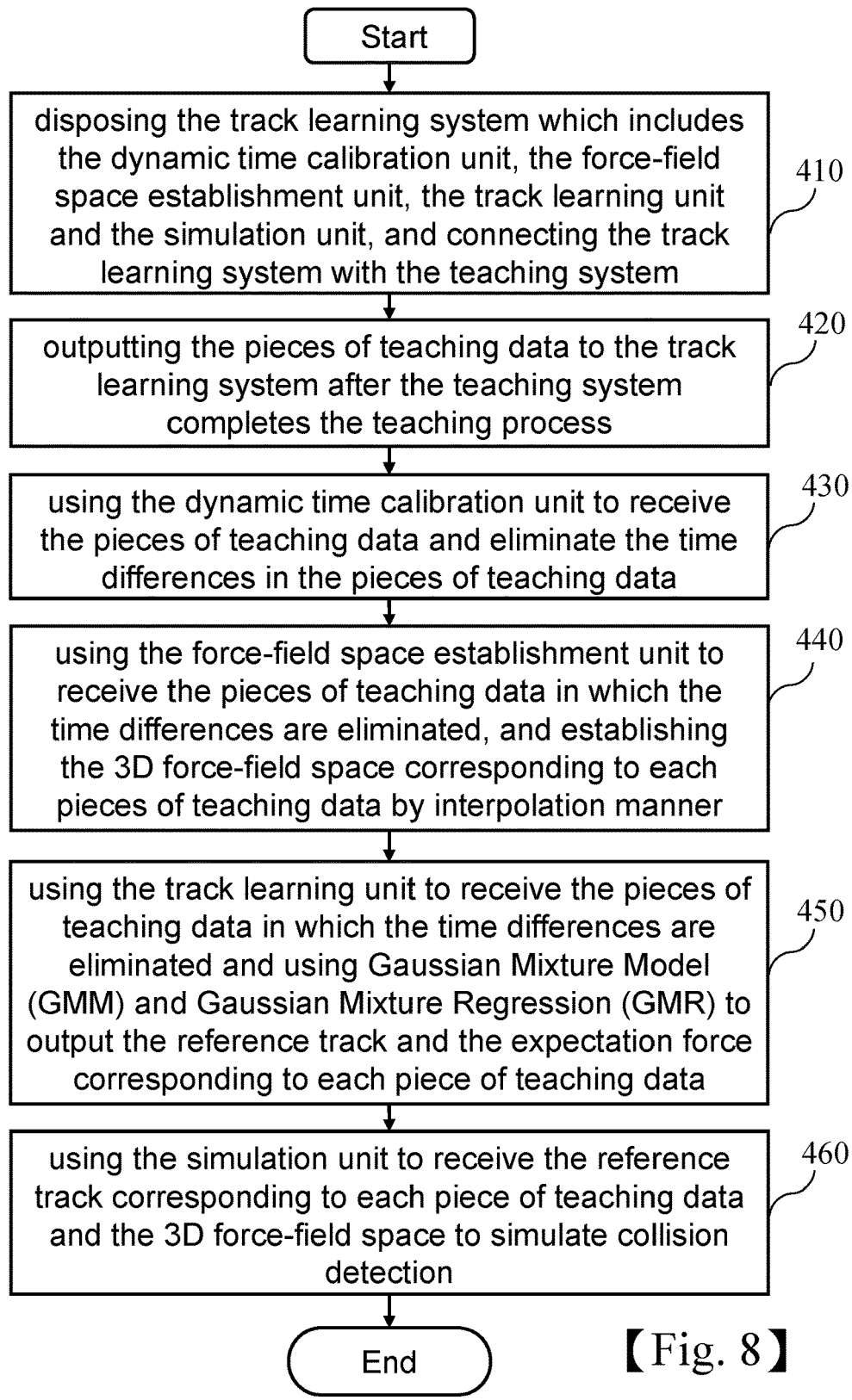

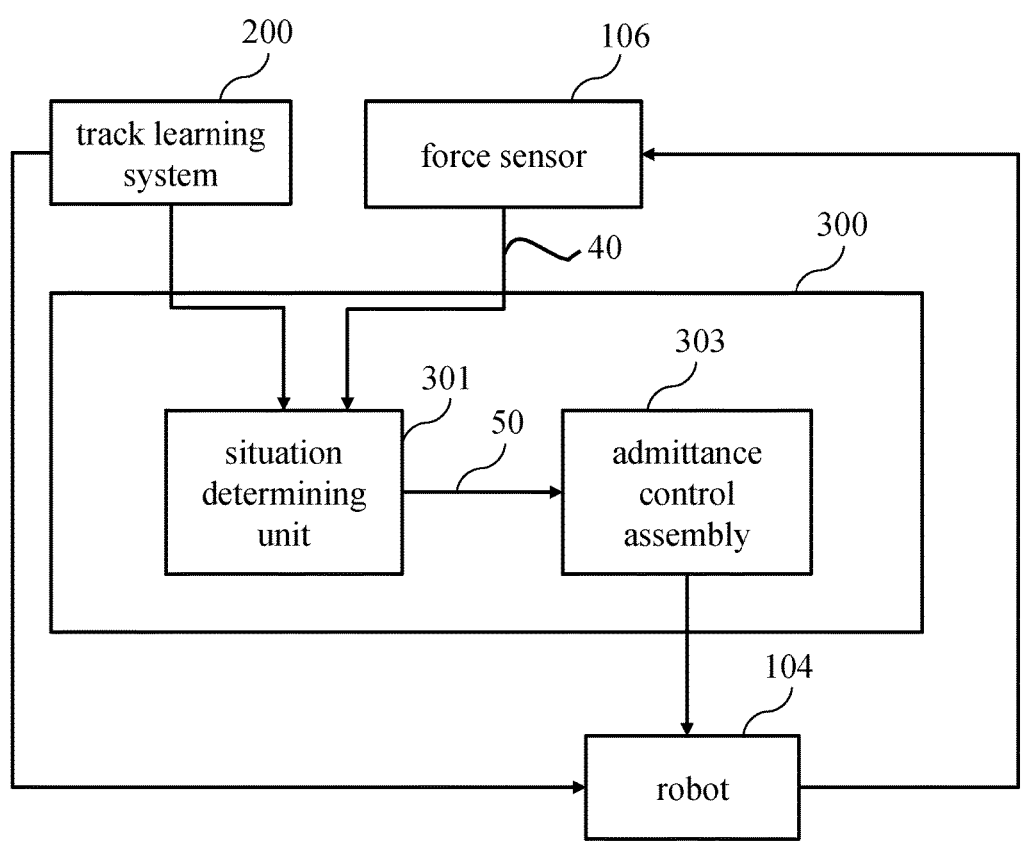
【Fig. 9】

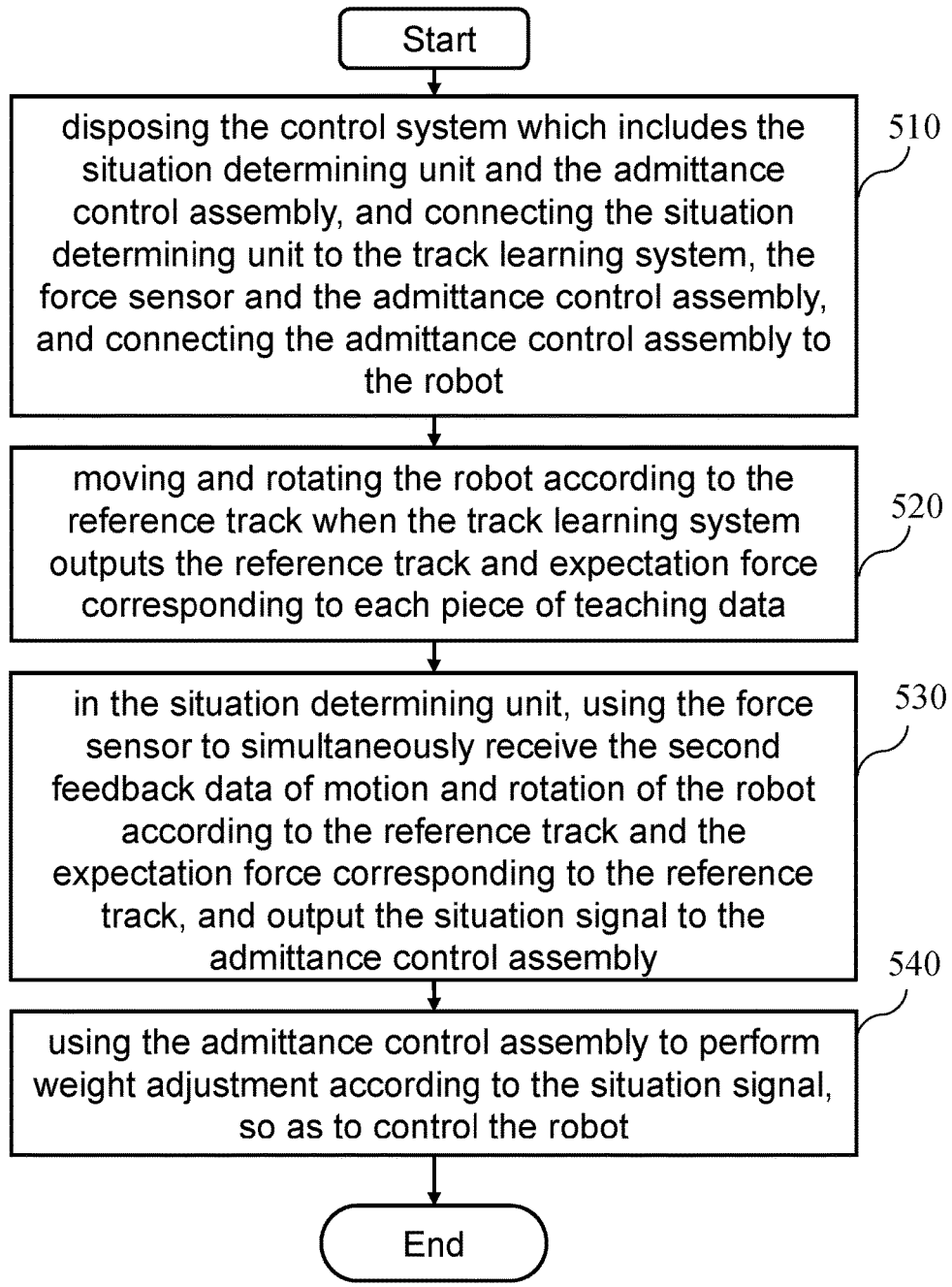
[Fig. 10]

ROBOT TEACHING SYSTEM AND CONTROL METHOD THEREOF

BACKGROUND OF RELATED ART

1. Technical Field

The present disclosure relates to a teaching system and a control method thereof, more particularly to a robot teaching system and a control method thereof.

2. Description of the Background Art

In recent years, with rapid development in mechanism, automation control and computer technologies, a robot has widely applied in various industries for providing high-efficiency and stable automation production and assembly operation.

Generally, most robots are applied in repetitive works, such as installation, manufacture, welding, cutting, pressurization, transport and detection, and so on. In this case, the work must be well planned in advance, and a teaching device is used to teach the robot to move and rotate along a fixed track, to enable the robot to perform the works repetitively.

Generally, while operating the convention teaching device, the user can only control the robot to move according to the teaching track, but can not understand a current situation of the robot. Hence, the risk for lack of user's instant reaction to the accident situation of the robot in the conventional robot teaching system may occur. What is need is to develop a novel robot teaching system to solve the conventional technology problem.

SUMMARY

An object of the present disclosure is to provide a robot teaching system and a control method thereof.

In order to achieve the object, the present disclosure provides a robot teaching system adapted to teach a robot and store pieces of teaching data. The robot teaching system includes a haptic device and a force sensor. The haptic device is connected with the robot, and the force sensor is disposed on the robot. The haptic device is configured to generate and output the pieces of teaching data to the robot, to enable the robot to move and rotate according to each piece of the teaching data. The force sensor is configured to capture first feedback data corresponding to the motion and rotation of the robot according to each piece of the teaching data, and output a feedback signal, which corresponds to the first feedback data, to the haptic device.

In addition, the present disclosure provides a control method for the robot teaching system. The control method includes steps of: connecting a haptic device to a robot; disposing a force sensor on the robot; using the haptic device to generate and output pieces of teaching data to the robot; storing the pieces of teaching data; moving and rotating the robot according to each piece of teaching data; using the force sensor to capture first feedback data corresponding to motion and rotation of the robot according to each piece of teaching data, and outputting a feedback signal, which corresponds to the first feedback data, to the haptic device.

In summary, difference between the present disclosure and the conventional technology is that, in the present disclosure, the force sensor is used to output the feedback signal to the haptic device, to drive the haptic device, so as to make the user have tactile sense as feedback.

By means of applying the aforementioned technology, the user who controls the haptic device can understand the situation of the robot and react to the situation immediately, so as to avoid the risk due to lack of user's instant reaction to the situation of the robot in the conventional robot teaching system.

BRIEF DESCRIPTION OF THE DRAWINGS

The detailed structure, operating principle and effects of the present disclosure will hereinafter be described in more detail with reference to the accompanying drawings that show various embodiments of the present disclosure.

FIG. 1 is a schematic view of an application of a robot teaching system of the present disclosure.

FIG. 2 is a block diagram of the robot teaching system of the present disclosure.

FIG. 3 is a flowchart of control method for the robot teaching system shown in FIG. 2.

FIG. 4 is a block diagram of a force sensor shown in FIG. 2.

FIG. 5 is a flowchart of a control method for the force sensor shown in FIG. 4.

FIG. 6 is a flowchart of a robot control method of using a haptic device of the robot teaching system of the present disclosure.

FIG. 7 is a block diagram of a track learning system of the robot teaching system of the present disclosure.

FIG. 8 is a flowchart of a control method for the track learning system shown in FIG. 7.

FIG. 9 is a block diagram of a control system for the robot teaching system of the present disclosure.

FIG. 10 is a flowchart of control method for the control system shown in FIG. 9.

DETAILED DESCRIPTION

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Detail illustration of the application environment of the robot teaching system is described prior to illustration of the robot teaching system and control method of the present disclosure. A haptic device 102 of a robot teaching system 100 is disposed at an operation end of a robot 104, and a force sensor 106 is disposed on a flange connection interface of an end of the robot 104. The robot 104 is used to control a jig to complete work. Next, a user 12 directly controls the haptic device to quickly teach the robot to use the jig to complete any work (as shown in FIG. 1 which shows a schematic view of the application of the robot teaching system of the present disclosure), such as the component assembly work in an automated production line. The illustrations of definitions of nouns used in the present disclosure are described. Pieces of teaching data described in the present disclosure comprise multiple tracks, and each track includes multiple displacements of continuous points, and each point includes location information in directions of six degrees of freedom (x, y, z, Rx, Ry, Rz) and information of 3D forces (Fx, Fy, Fz) applied to the point.

The robot teaching system and the control method of the present disclosure will hereinafter be described in more detail with reference to the accompanying drawings. Please refer to FIG. 2 which shows a block diagram of the robot teaching system of the present disclosure. The robot teaching system 100 of the present disclosure is adapted to teach the robot 104 and store the pieces of teaching data 10. The detailed description of each piece of teaching data 10 is omitted because its definition is illustrated in previous paragraph. The robot teaching system 100 includes the haptic device 102 and the force sensor 106. The haptic device 102 is connected to the robot 104, and the force sensor 106 is disposed on the robot 104.

The haptic device 102 is configured to generate the pieces of teaching data 10 to the robot 104, so as to enable the robot 104 to move and rotate according to each piece of teaching data 10. The force sensor 106 is configured to capture first feedback data 20 corresponding to motion and rotation of the robot 104 according to each piece of teaching data 10, and output a feedback signal 30, which corresponds to the first feedback data 20, to the haptic device 102.

Please refer to FIG. 3 which shows a flowchart of a control method for the robot teaching system shown in FIG. 2. The control method includes steps of: connecting the haptic device to the robot (step 210); disposing the force sensor on the robot (step 220); using the haptic device to generate the pieces of teaching data to the robot (step 230); storing each piece of teaching data (step 240); moving and rotating the robot according to each piece of teaching data (step 250); and, using the force sensor to capture the first feedback data corresponding to motion and rotation of the robot according to each piece of teaching data, and outputting the feedback signal, which corresponds to the first feedback data, to the haptic device (step 260). By performing aforementioned steps, the force sensor 106 outputs the feedback signal 30, which corresponds to the first feedback data, to the haptic device 102 for driving the haptic device 102, so as to make the user have tactile sense as feedback.

The embodiment of the present disclosure will hereinafter be described in more detail with reference to FIGS. 2 and 3. The haptic device 102 can be a teaching device includes six axial joints and link rods, and each axial joint is provided with a built-in driving motor capable of outputting a coding location. The driving motor can enable the haptic device 102 to make the user have tactile sense, and the coding location outputted by the driving motor is used to calculate the current posture message of the haptic device 102 in a six-dimensional space. While the user operates the haptic device 102, the robot teaching system 100 continuously captures and sends the current six-dimensional posture message of the haptic device 102, to the robot 104 for further processing. Therefore, the purpose of simultaneously controlling the robot 104 and teaching exemplary action can be achieved, and the user can intuitionally operate the haptic device 102 without acquainting the motion logical rule in six degrees of freedom. Preferably, the robot 104 can be any brand of robot.

In present embodiment, the force sensor 106 can be a force sensor capable of sensing the direction in at least three degrees of freedom, and mounted on the flange connection interface of the end of the robot 104. While the haptic device 102 simultaneously control the robot 104, the force sensor 106 can continuously capture the first feedback data 20 corresponding to motion and rotation of the robot 104 and output the feedback signal 30, which corresponds to the first feedback data 20, to the haptic device. For example, when the robot 104 collides or extrudes with an external object during its rotation and motion, the feedback signal 30 outputted from the force sensor 106 is able to drive the motor built-in the haptic device 102 to make the user have tactile sense as feedback, such that the user can immediately understand the current situation of the robot 104.

While the haptic device 102 is simultaneously controlling the robot 104, the force sensor 106 may output the feedback signal 30 with incorrect information due to noise, gravity error, or different coordinate axis, so the force sensor 106 must perform the signal processing to output the feedback signal 30 with correct information. Please refer to FIG. 4 which shows a block diagram of a force sensor shown in FIG. 2. The force sensor 106 includes a noise filter unit 108, a gravity error correction unit 110 and a coordinate transformation unit 112. The gravity error correction unit 110 is connected to the noise filter unit 108 and the coordinate transformation unit 112. The noise filter unit 108 is configured to receive the first feedback data 20 and eliminate noise in the first feedback data 20. The gravity error correction unit 110 is configured to receive the first feedback data 20 in which the noise is eliminated, and eliminate the gravity error in the received first feedback data 20. The coordinate transformation unit 112 is configured to transform a coordinate of the first feedback data 20 in which the noise and the gravity error are eliminated, and output the feedback signal 30 to the haptic device 102.

Please refer to FIG. 5 which shows a flowchart of the control method of FIG. 4. In FIG. 5, the step 260 further comprise steps blew. The noise filter unit receives the first feedback data and eliminates noise in the first feedback data (step 262). The gravity error correction unit receives the first feedback data in which the noise is eliminated, and eliminates the gravity error in the received first feedback data (step 264). The coordinate transformation unit is configured to transform the coordinate of the first feedback data in which the noise and the gravity error are eliminated, and output the feedback signal to the haptic device (step 266). By performing aforementioned steps, the force sensor can output the feedback signal with correct information, to the haptic device for further driving operation, so as to make the user have tactile sense as feedback.

The embodiment of the present disclosure will hereinafter be described in more detail with reference to FIGS. 4 and 5. The robot 106 may generate agitation after power-on, and the force sensor 106 may capture the first feedback data 20 with noise due to the agitation after the force sensor 106 is mounted on the robot 104, so the noise in the first feedback data 20 captured by the force sensor 106 must be eliminated. In present embodiment, the noise filter unit 108 can be, but not limited to, Kalman filter. The noise filter unit 108 can perform low-latency and high-efficiency filter processing on the first feedback data 20, to eliminate the noise due to the agitation.

While the robot 104 is rotating, the force sensor 106 may generate the gravity error due to its weight. In present embodiment, the gravity error correction unit 110 records the gravity errors of the force sensor 106 in direction of Rx and Ry during various rotation of the robot 104 in advance, and performs linear fitting on the recorded gravity errors to find a relationship equation. As a result, the current posture message of the robot can be brought into the relationship equation to calculate the current gravity error, so as to eliminate the gravity error in the first feedback data 20. In present embodiment, the relationship equation is: $F=F_{sensor}-(\cos(Rz) \times F_{(Rx)error} + \cos(Rz) \times F_{(Ry)error})$; wherein F is the first feedback data 20 in which the noise is eliminated, $F_{sensor}$ is the first feedback data 20 to eliminate the noise, $F_{(Rx)error}$ is a fitting equation with the direction Rx, $F_{(Ry)error}$ is the fitting equation with the direction Ry, and $F_{(Rx)error}$, $F_{(Ry)error}$ are respectively combined with cos(Rz) vector.

The rotation of the robot 106 may cause the difference between the coordinate axes of the force sensor 106 and the robot 104, which results in an incorrect direction of the tactile sense as feedback, so the feedback signal 30 generated by the force sensor 106 must be performed coordinate transformation processing before being outputted. In present embodiment, the coordinate transformation unit 112 uses the homogenous matrix calculation formula to transform the coordinate of the force sensor 106 based on the current posture message of the robot 104, so as to output the feedback signal 30 corresponding to the correct situation of the robot 104.

In addition, while the user operates the haptic device 102, if the haptic device 102 is operated to reach its hardware limit but the robot 104 does not reach a target location anticipated by the user, some steps can be performed to enable the haptic device 102 to relatively control the robot 104. Please refer to FIG. 6 which shows a flowchart of method of relatively controlling the robot by the haptic device of the robot teaching system of the present disclosure. As shown in FIG. 6, the control method includes following steps: receiving a pause command to stop motion and rotation of the robot (step 302); moving and rotating the haptic device to a predetermined position (step 304); recording a first current posture message of the haptic device at the predetermined position (step 306); receiving a start command to start motion and rotation of the haptic device, and simultaneously recording a second current posture message of the haptic device after the haptic device starts to move and rotate (step 308); controlling the motion and rotation of the robot according to the first current posture message and the second current posture message (step 310). By performing aforementioned steps, the user can stop the motion and rotation of the robot and then move the haptic device to the predetermined position, such that an operating space is formed for the user to operate the haptic device to read the target location which the user anticipates.

In greater detail, in present embodiment, the relationship equation that the haptic device relatively controls the robot is: $Command_{x,y,z,Rx,Ry,Rz} = tmpR_{x,y,z,Rx,Ry,Rz} + (H_{x,y,z,Rx,Ry,Rz} - oldH_{x,y,z,Rx,Ry,Rz})$; wherein $Command_{x,y,z,Rx,Ry,Rz}$ is a command transmitted to the robot for execution, $tmpR_{x,y,z,Rx,Ry,Rz}$ is a posture of the robot after motion and rotation of the robot is paused, $H_{x,y,z,Rx,Ry,Rz}$ is the second current posture message, $oldH_{x,y,z,Rx,Ry,Rz}$ is the first current posture message.

In the embodiment, the haptic device 102 can be simultaneously operated in six degrees of freedom, so as to solve the problem that the convention teaching device is unable to simultaneously operate in multiple degrees of freedom. In addition, in order to reduce operation difficulty, the haptic device 102 can be limited to only operate in the specific degree of freedom. In the embodiment, a scale of motion of the robot 104 controlled by the haptic device 102 is adjustable.

The robot teaching system can further includes a track learning system to make sure safety while the robot 104 is learning track and further make sure that the robot 104 learns the optimized track. Please refer to FIG. 7 which shows a block diagram of the track learning system of the robot teaching system of the present disclosure. The track learning system 200 is connected with the teaching system 100, and the track learning system 200 includes a dynamic time calibration unit 202, a force-field space establishment unit 204, a track learning unit 206 and a simulation unit 208.

The dynamic time calibration unit 202 is configured to receive the pieces of teaching data 10 of the teaching system 100 and eliminate time differences between the pieces of teaching data 10. The force-field space establishment unit 204 is configured to receive the pieces of teaching data 10 in which the time differences are eliminated, and establish a 3D force-field space corresponding to each of pieces of teaching data 10 by interpolation manner. The track learning unit 206 is configured to receive the pieces of teaching data 10 in which the time differences are eliminated, and use Gaussian Mixture Model (GMM) and Gaussian Mixture Regression (GMR) to generate and output a reference track and an expectation force corresponding to each piece of teaching data. The simulation unit 208 is configured to receive the reference track corresponding to each piece of teaching data 10 and the 3D force-field space, to simulate collision detection.

Please refer to FIG. 8 which shows a flowchart of a control method for the track learning system shown in FIG. 7. The control method includes steps: disposing the track learning system which includes the dynamic time calibration unit, the force-field space establishment unit, the track learning unit and the simulation unit, and connecting the track learning system with the teaching system (step 410); outputting the pieces of teaching data to the track learning system after the teaching system completes the teaching process (step 420); using the dynamic time calibration unit to receive the pieces of teaching data and eliminate the time differences in the pieces of teaching data (step 430); using the force-field space establishment unit to receive the pieces of teaching data in which the time differences are eliminated, and establishing the 3D force-field space corresponding to each pieces of teaching data by interpolation manner (step 440); using the track learning unit to receive the pieces of teaching data in which the time differences are eliminated and using Gaussian Mixture Model (GMM) and Gaussian Mixture Regression (GMR) to output the reference track and the expectation force corresponding to each piece of teaching data (step 450); using the simulation unit to receive the reference track corresponding to each piece of teaching data and the 3D force-field space to simulate collision detection (step 460). By performing aforementioned steps, the track learning system can perform simulation to improve safety while the robot is learning track, and make sure that the robot learns the optimized track, so as to improve the efficiency of the robot.

Please refer to FIGS. 7 and 8 which show the embodiment of the track learning system of the present disclosure. In the teaching process, the teaching system 100 teaches the robot 104 for many times, and after the teaching process is completed, the teaching system 100 stores the pieces of teaching data generated during the teaching process. In present embodiment, the teaching system 100 teaches the robot 104 for five times in the teaching process, but the present disclosure is not limited thereto. That the user operates the haptic device 102 to complete multiple teaching cases in different speeds may cause the time difference problem, so the dynamic time calibration unit 202 must perform dynamic time calibration on the five pieces of teaching data 10 obtained by the teaching system 100, to eliminate the time differences. Next, the force-field space establishment unit 204 establishes a 3D space and divides the 3D space into multiple grid points, and places pieces of teaching data 10, in which the time difference is eliminated, in grid points corresponding thereto, and then performs interpolation to fill the empty grid point where no teaching data 10 is placed. Each grid point includes 3D force information (Fx, Fy, Fz). As a result, establishment of the 3D force-field space corresponding to each piece of teaching data is completed. The track learning unit 206 receives each piece of teaching data in which the time difference is eliminated, and uses Gaussian Mixture Model (GMM) and Gaussian Mixture Regression (GMR) to generate and output the reference track and the expectation force corresponding to each piece of teaching data. The simulation unit 208 receives the reference track space corresponding to each piece of teaching data and the 3D force-field to simulate the collision detection, so as to improve safety while the robot is learning track, and the efficiency of the robot.

In addition, in order to solve the problem of external interference or jig shift occurred during operation of the robot, the robot teaching system can further include a control system. Please refer to FIG. 9 which shows a block diagram of a control system of the robot teaching system of the present disclosure. The control system 300 includes a situation determining unit 301 and an admittance control assembly 303. The situation determining unit 301 is connected to the track learning system 200, the force sensor 106 and the admittance control assembly 303. The admittance control assembly 303 is connected to the robot 104. While the robot 104 is moving and rotating according to the reference track, the situation determining unit 301 is configured to use the force sensor 106 to simultaneously receive second feedback data 40 of motion and rotation of the robot 104 and the expectation force corresponding to the reference track, and then output a situation signal 50 to the admittance control assembly 303. The admittance control assembly 303 is configured to perform weight adjustment according to the situation signal 50, so as to control the robot 104.

Please refer to FIG. 10 which shows a flowchart of a control method of the control system shown in FIG. 9. The control method includes steps of: disposing the control system which includes the situation determining unit and the admittance control assembly, and connecting the situation determining unit to the track learning system, the force sensor and the admittance control assembly, and connecting the admittance control assembly to the robot (step 510); moving and rotating the robot according to the reference track when the track learning system outputs the reference track and expectation force corresponding to each piece of teaching data (step 520); in the situation determining unit, using the force sensor to simultaneously receive the second feedback data of motion and rotation of the robot according to the reference track and the expectation force corresponding to the reference track, and output the situation signal to the admittance control assembly (step 530); using the admittance control assembly to perform weight adjustment according to the situation signal, so as to control the robot (step 540). By performing aforementioned steps, the control system can determine whether the external interference or the jig shift occurs, and performs weight adjustment for the admittance control assembly according to a determination result.

The embodiment of present disclosure will be illustrated with reference to FIGS. 8 and 9 in detail. When the track learning system 200 outputs the reference track and the expectation force corresponding to each piece of teaching data, the robot 104 is rotated and moved according to the reference track, and the situation determining unit 301 uses the force sensor 106 to simultaneously receive the second feedback data 40 corresponding to motion and rotation of the robot 104 according to the reference track, and receive the expectation force corresponding to the reference track, and determine the situation of the robot according to the difference between the second feedback data 40 and the expectation force corresponding to the reference track, so as to output the situation signal 50 indicating whether the external interference or jig shift occurs. Next, the weight adjustment for the admittance control assembly 303 is performed according to the determined result, that is, the admittance control assembly 303 performs the weight adjustment according to the situation signal 50. The conventional force-feedback control system only has a reference track, that is, if the robot 104 performs work of assembling components and encounter the component (such as spring assembly) which must be applied force to be assembled, the general force-feedback control system may fail to obtain the correct location or direction to apply force, and then correct the force in a wrong direction because of elastic force of the spring assembly. The control system of the present disclosure can use the expectation force to obtain the correct location or direction to apply force while the robot performs work of assembling component.

In addition, the admittance control assembly 303 of the control system 300 has a controllable vibration frequency range with a certain degree of upper limit, so the admittance control assembly 303 may malfunction or have side effect possibly subject to external excessive vibration frequency. Hence, while the robot 104 performs the reference track, the situation determining unit 301 continuously capture the second feedback data 40 and subtracts the second feedback data 40 by the expectation force corresponding to the reference track, so as to determine whether the external interference is the vibration or the jig shift (if the result of subtracting the second feedback data 40 by the expectation force is a fluctuation, the external interference is determined to be the vibration, and the vibration frequency is then calculated; if the result of subtracting the second feedback data 40 by the expectation force is always a positive value or a negative value, the external interference is determined to be the jig shift). Next, the admittance control assembly 303 performs weight adjustment according to the determined result.

In conclusion, the difference between the present disclosure and the conventional technology is that, in the present disclosure, the force sensor is used to output the feedback signal to the haptic device for driving the haptic device, so as to make the user have tactile sense as feedback. Therefore, the conventional technology problem can be solved. In addition, through the robot teaching system of the present disclosure, the user can intuitively and simultaneously operate the robot in multiple degrees of freedom, so as to solve the problem that complex and cumbersome setting process of the convention teaching device in teaching track of continuous point displacements to the robot. The force sensor can be used to eliminate the noise and the gravity error in the first feedback data, and transform the coordinate of the first feedback data, so as to output correct feedback signal to the haptic device, and make the user have correct tactile sense as feedback. Furthermore, the track learning system can perform simulation according to the reference track and the 3D force-field space, to improve safety while the robot is learning track, and make sure that the robot learns the optimized track, so as to improve the efficiency of the robot. The control system can determines whether the external interference or jig shift occurs, and the admittance control assembly performs the weight adjustment according to the determination result. According to the reference track and the expectation force, the control system can further obtain the correct location or direction to apply force during process of assembling components, so as to facilitate to adjust the situation of the robot.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A robot teaching system, adapted to teach a robot and store pieces of teaching data, and the robot teaching system comprising:
   a haptic device, connected with robot and configured to generate and output the pieces of teaching data to the robot, to enable the robot to move and rotate according to each piece of teaching data;
   a force sensor, disposed on the robot and configured to capture first feedback data corresponding to the motion and rotation of the robot according to each piece of teaching data, and output a feedback signal, which corresponds to the first feedback data, to the haptic device; and
   a track learning system connected to the teaching system, wherein the track learning system comprises a dynamic time calibration unit, a force-field space establishment unit, a track learning unit and a simulation unit, and after the teaching system completes teaching process, the pieces of teaching data are outputted to the track learning system, and the dynamic time calibration unit is configured to receive the pieces of teaching data from the teaching system and eliminates time differences between the pieces of teaching data, the force-field space establishment unit is configured to receive the pieces of teaching data, in which the time differences are eliminated, and establish a 3D force-field space respectively corresponding to the pieces of teaching data, by interpolation manner; wherein the track learning unit is configured to receive the teaching data, in which the time differences are eliminated, and output reference tracks and expectation forces, which respectively correspond to the pieces of teaching data, by using Gaussian Mixture Model (GMM) and Gaussian Mixture Regression (GMR); wherein the simulation unit is configured to receive the reference tracks, which respectively correspond to the pieces of teaching data, and the 3D force-field space, and simulates collision detection.

2. The robot teaching system of claim 1, wherein the force sensor comprises a noise filter unit, a gravity error correction unit and a coordinate transformation unit, the gravity error correction unit is connected to the noise filter unit and the coordinate transformation unit, and the noise filter unit is configured to eliminate noise in the first feedback data, the gravity error correction unit is configured to receive the first feedback data, in which the noise is eliminated, and eliminate a gravity error in the first feedback data, and the coordinate transformation unit is configured to transform a coordinate of the first feedback data in which the noise and the gravity error are eliminated, and the coordinate transformation unit outputs the feedback signal to the haptic device.

3. The robot teaching system of claim 1, further comprising a control system which comprises a situation determining unit and an admittance control assembly, and wherein the situation determining unit is connected to the track learning system, the force sensor and the admittance control assembly, and the admittance control assembly is connected with the robot, and when the track learning system outputs the reference track and the expectation force corresponding to each piece of teaching data and the robot is moved and rotated according to the reference track, and the situation determining unit uses the force sensor to simultaneously receive second feedback data of the robot which is moved and rotated according to the reference track, and receive the expectation force corresponding to the reference track, and the situation determining unit outputs a situation signal to the admittance control assembly;
   wherein the admittance control assembly is configured to perform weight adjustment according to the situation signal, so as to control the robot.

4. The robot teaching system of claim 1, wherein the haptic device is configured to adjust a scale of controlling motion of the robot.

5. A control method for a robot teaching system, comprising:
   connecting a haptic device to a robot;
   disposing a force sensor on the robot;
   using the haptic device to generate and output pieces of teaching data to the robot;
   storing the pieces of teaching data;
   moving and rotating the robot according to each piece of teaching data;
   using the force sensor to capture first feedback data corresponding to motion and rotation of the robot according to each piece of teaching data, and outputting a feedback signal, which corresponds to the first feedback data, to the haptic device;
   disposing a track learning system which is connected the teaching system and comprises a dynamic time calibration unit, a force-field space establishment unit, a track learning unit and a simulation unit;
   outputting the pieces of teaching data to the track learning system after the teaching system completes teaching process;
   using the dynamic time calibration unit to receive the pieces of teaching data and eliminate time differences between the pieces of teaching data;
   using the force-field space establishment unit to receive the pieces of teaching data in which the time differences are eliminated, and establishing a 3D force-field space corresponding to the pieces of teaching data by an interpolation manner;
   using the track learning unit to receive the pieces of teaching data in which the time differences are eliminated, and using Gaussian Mixture Model and Gaussian Mixture Regression to output a reference track and an expectation force corresponding to each piece of teaching data; and using the simulation unit to receive the reference tracks respectively corresponding to the pieces of teaching data and the 3D force-field space to simulate collision detection.

6. The control method of claim 5, wherein the force sensor comprises a noise filter unit, a gravity error correction unit and a coordinate transformation unit, and the step of using the force sensor to capture the first feedback data corresponding to motion and rotation of the robot according to each piece of teaching data and outputting a feedback signal, which corresponds to the first feedback data, to the haptic device, further comprises:

using the noise filter unit to receive the first feedback data and eliminate noise in the first feedback data;

using the gravity error correction unit to receive the first feedback data in which the noise is eliminated, and eliminate a gravity error in the first feedback data; and using the coordinate transformation unit to transform a coordinate of the first feedback data in which the noise and the gravity error are eliminated, so as to output the feedback signal to the haptic device.

7. The control method of claim 6, further comprising:
disposing a control system which comprises a situation determining unit and an admittance control assembly, connecting the situation determining unit to the track learning system, the force sensor and the admittance control assembly, and connecting the admittance control assembly to the robot;

moving and rotating the robot the reference track when the track learning system outputs the reference track and the expectation force corresponding to each piece of teaching data;

outputting, by the situation determining unit, a situation signal to the admittance control assembly, when the situation determining unit uses the force sensor to simultaneously receive second feedback data of motion and rotation of the reference track and the expectation force corresponding to the reference track; and performing, by the admittance control assembly, weight adjustment to control the robot according to the situation signal.

8. The control method of claim 5, further comprising:
receiving a pause word to stop motion and rotation of the robot;

moving and rotating the haptic device to a predetermined position;

recording a first current posture message of the haptic device at the predetermined position;

receiving a start command to start motion and rotation of the haptic device, and simultaneously recording a second current posture message of the haptic device after starting motion and rotation of the haptic device; and controlling the motion and rotation of the robot according to the first current posture message and the second current posture message.

* * * * *